United States Patent [19]
Ramillon et al.

[11] Patent Number: 5,421,474
[45] Date of Patent: Jun. 6, 1995

[54] DEVICE FOR THE ASSEMBLY BY CLAMPING OF AN ELASTICALLY COMPRESSIBLE PART

[75] Inventors: Jean-Pierre Ramillon, Perly; Louis Zuccone, Onex, both of Switzerland

[73] Assignee: Honeywell Lucifer S.A., Carouge, Switzerland

[21] Appl. No.: 277,779

[22] Filed: Jul. 20, 1994

Related U.S. Application Data

[63] Continuation of Ser. No. 60,249, May 7, 1993, abandoned.

Foreign Application Priority Data

Jun. 11, 1992 [CH] Switzerland .......... 1853/92

[51] Int. Cl.$^6$ .......................... B65D 45/32
[52] U.S. Cl. .................. 220/319; 220/285; 220/378; 137/584
[58] Field of Search ............ 220/284, 285, 319, 378; 137/583, 584

[56] References Cited

U.S. PATENT DOCUMENTS

| | | | |
|---|---|---|---|
| 1,207,937 | 12/1916 | Kruse | 220/319 X |
| 1,673,010 | 6/1928 | Mauser | 220/319 |
| 2,215,537 | 9/1940 | Bjong | 220/319 X |
| 2,332,458 | 10/1949 | Muney et al. | 220/319 X |
| 2,368,105 | 1/1945 | Berge | 220/319 X |
| 2,533,531 | 12/1950 | Stephens | |
| 2,861,712 | 11/1958 | Bermingham et al. | |
| 4,181,143 | 1/1980 | Fallon | 220/319 X |
| 4,565,297 | 1/1986 | Korner et al. | 220/254 |

FOREIGN PATENT DOCUMENTS

| | | | |
|---|---|---|---|
| 1401763 | 4/1965 | France | |
| 319409 | 9/1929 | United Kingdom | 220/319 |
| 1020899 | 2/1966 | United Kingdom | |
| 2132315 | 7/1984 | United Kingdom | |

*Primary Examiner*—Allan N. Shoap
*Assistant Examiner*—Stephen Cronin
*Attorney, Agent, or Firm*—Kane, Dalsimer, Sullivan, Kurucz, Levy, Eisele and Richard

[57] ABSTRACT

A cylindrical housing (1) and a body (4) having a shape matching the shape of the housing (1). The body (4) is immobilized, so as to compress the elastically compressible part (3), by a split ring (6) placed in a groove (7) of the cylindrical wall of the housing (1). The shape and dimensions of the ring (6) are selected in such a way that it bears against a peripheral surface of the body (4) in order to prevent it from moving outwards. The ring (6) is locked in the groove (7) by a collar (8) having zones (82) which, by virtue of their shape, prevent the ring (6) from moving out of the groove (7) and bulges (81) interacting with a groove (41) of the body (4) for the fixing by snap-fitting of the collar onto the body.

10 Claims, 2 Drawing Sheets

DEVICE FOR THE ASSEMBLY BY CLAMPING OF AN ELASTICALLY COMPRESSIBLE PART

"This is a continuation of copending application Ser. No. 08/060,249 filed on May 7, 1993.

FIELD OF THE INVENTION

The present invention relates to a device for the assembly by clamping of an elastically compressible part in the bottom of a cylindrical housing by means of a body having a shape matching the shape of the housing enabling it to move axially in said housing. This device is used more particularly for the assembly by clamping of the elastic membrane by a cover of a solenoid valve.

PRIOR ART

It is known to fix by clamping the elastic membrane of a servocontrolled two-way solenoid valve by a screwed cover, either by means of auxiliary screws, or by means of an external and internal screw thread with which the cover and the housing are provided.

SUMMARY OF THE INVENTION

The object of the present invention is to propose a much simpler construction and in particular to eliminate the screwing.

The device according to the present invention is distinguished by the fact that said body is immobilized, so as to compress the elastically compressible part, by a split ring placed in a groove of the cylindrical wall of the housing, that the shape and dimensions of the ring are selected in such a way that it bears against a peripheral surface of said body in order to prevent it from moving outward, that the ring is locked in the groove by a collar having first zones which, by virtue of their shape, prevent the ring from moving out of said groove and second zones provided with means matching corresponding means of said body participating in the fixing by snap-fitting of the collar onto the body.

The simplest solution was, of course, to use a collar or split ring for fixing the body in the housing. However, it was shown that the ring does not penetrate sufficiently into the groove and that, under the effect of the pressure of the fluid in the solenoid valve control chamber, the ring can be expelled. The use of a locking collar makes it possible to ensure, on the one hand, that the ring is properly located inside the groove while preventing the body from moving out of the housing as a result of the fact that sectors of the collar bear against the ring in order to prevent it from moving out and, on the other hand, that the collar is fixed to the body by snap-fitting means.

If the ring is required to be removable, a notch can be advantageously provided in the groove allowing the insertion, for example, of a screwdriver in order to push the ring out of the groove.

According to one embodiment of the invention, the collar which will hereafter be called a safety collar, also has means for enabling it to be removed. There are preferably two such means : a tab which also makes it possible to cover the notch of the groove so that the ring cannot be extracted before the collar is removed and one or more discontinuities on the periphery of the collar allowing the insertion, for example, of a screwdriver or of a similar member in order to remove the safety collar.

According to one embodiment of the invention, the snap-fitting means consist either of an internal continuous or discontinuous bulge or rib on the collar which is made from an elastically deformable material, which is preferably synthetic or composite (carbon fiber or mineral fiber), whilst a groove is provided on the body for interacting with the bulge or rib on the collar.

It is also possible to provide a body made from a material having a certain elasticity whilst the collar is made from a rigid material and, in this case, the collar has a groove and the body a certain number of projections for fixing the collar.

This device is advantageously used for fixing an elastic membrane of a servocontrolled solenoid valve.

By cylindrical housing is meant any housing whose section perpendicular to its axis has a shape which is polygonal, elliptical, circular, etc.

BRIEF DESCRIPTION OF THE DRAWINGS

The invention will be described in more detail with the aid of the attached drawing.

DESCRIPTION OF THE PREFERRED EMBODIMENT(S)

Figure 2:
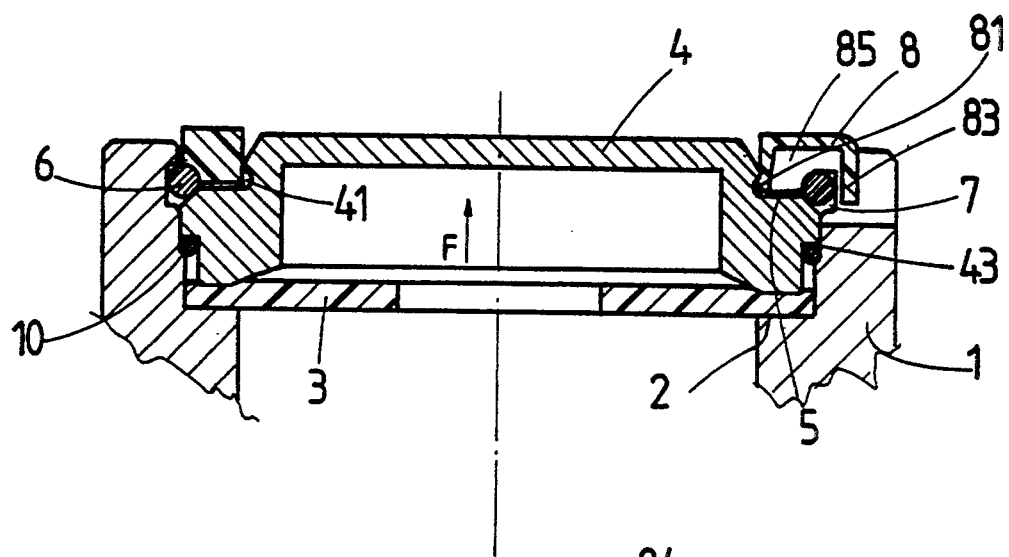
FIG. 2 is a sectional view along line II—II of FIG. 1.
Figure 1:
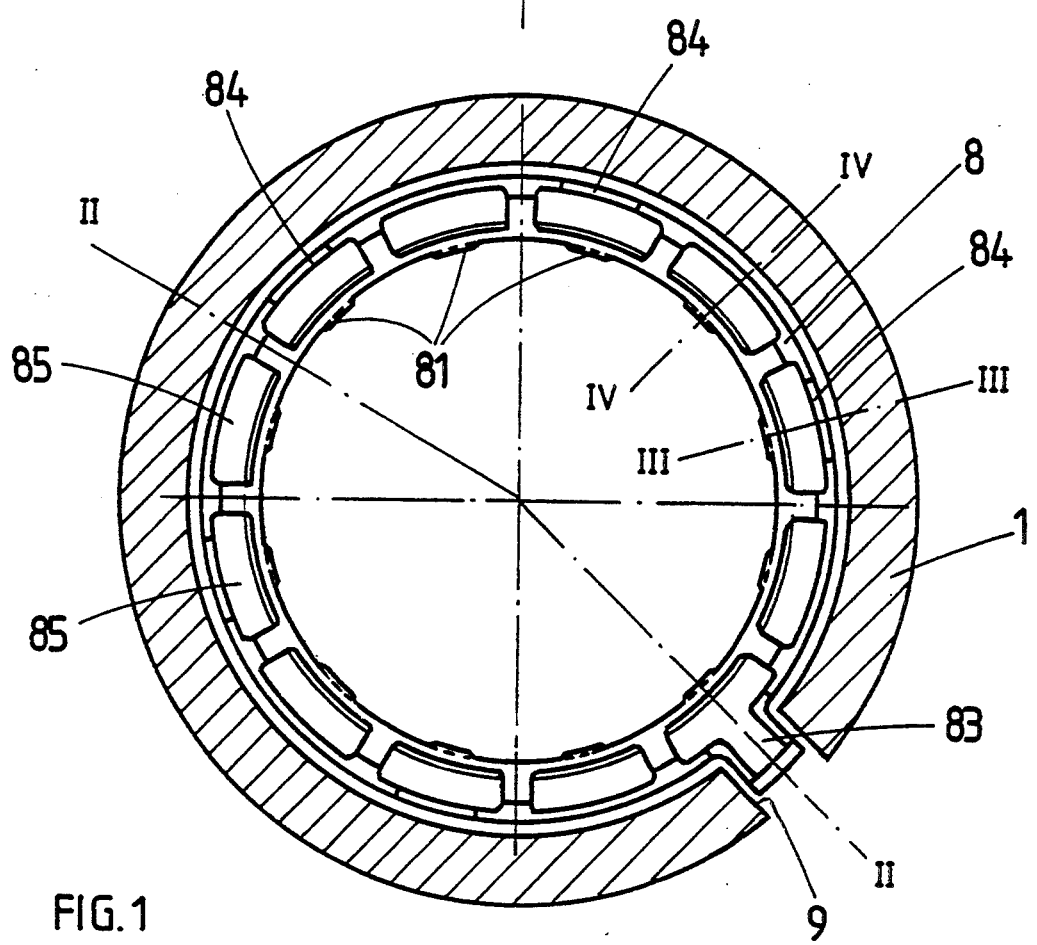
FIG. 1 is a view from below of the collar, complemented with a section of the housing of a device according to the invention.

Referring to FIGS. 1 and 2, a diagrammatical depiction of an assembly according to the invention is given.

In a housing 1 having a shoulder 2 is fixed a compressible membrane 3 by means of a cover body 4 whose shape matches the internal shape of the housing 1. The body 4 has, on its upper part, a narrowing forming a shoulder 5. A ring 6 is housed in a groove 7 of the housing 1 and bears, via a portion of its surface, against the body 4 in order to hold it pressed against the elastic membrane 3. The ring 6 bears in the present case on a beveled portion of the body 4.

In order to prevent the ring 6 from moving inopportunely out of the groove 7 under the thrust, in the direction F, exerted on the body 4 by the membrane 3, a safety collar 8 is fixed to the body 4. The collar 8 is snap-fitted by means of zones consisting of internal bulges 81 in a groove 41 of the body 4. In this case, the collar 8 is made from an elastically deformable material providing it with a certain elasticity in order to enable it to be assembled and removed by snap-fitting. Such a material can be a synthetic or composite material, for example carbon fiber or mineral fiber. The collar has, on the face opposite that provided with bulges 81, zones 82 having a shape matching the surface of the ring 6 so as to prevent the ring 6 from moving out of the groove 7.

Figure 3:
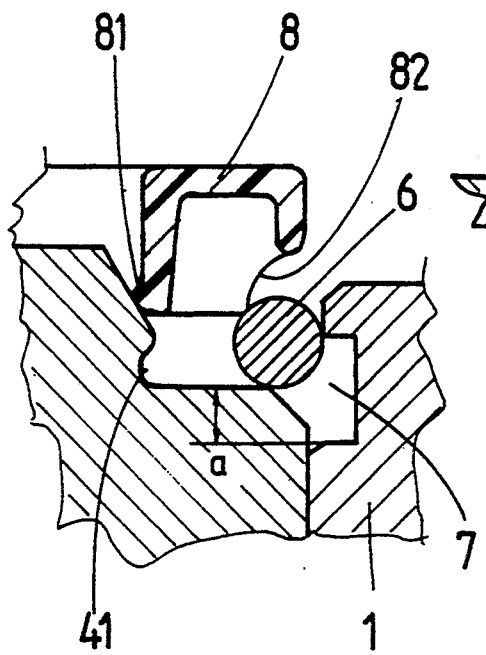
FIG. 3 is a sectional view along line III—III of FIG. 1.
Figure 4:
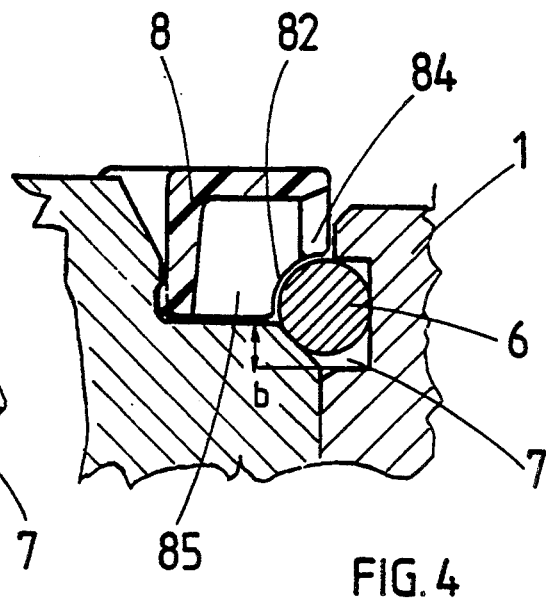
FIG. 4 is a partial sectional view along line IV—IV which is similar to FIG. 3 showing the fitting of the collar according to a preferred variant.

FIG. 4 shows the preferred embodiment of the invention according to which the shape and dimensions of the sectors 82 make it possible, during the fitting of the collar 8, to push the ring into the groove 7 and obtain maximum clamping of the membrane 3. By way of information, by comparing the lengths a and b shown in FIGS. 3 and 4, the relation a >b is obtained, that is to say that the body 4 is simultaneously pushed towards the membrane 3 during the fitting of the collar.

In order to enable the ring 6 to be removed, the housing 1 has a notch 9 allowing the insertion of a tool such as a screwdriver or the like in order to push the ring out of the groove 7. Nevertheless, if it is not desired for the ring to be removable, no notch 9 will be provided and, in this case, removal of the ring will be almost impossible.

In order to prevent an attempt at taking out the ring before removing the safety collar, the safety collar is provided with a tab 83 partially covering the notch 9, as shown in FIGS. 1 and 2, and in particular the ring 6. At the same time, this tab can be used to take out the safety collar 8, either with a finger or by inserting a screwdriver. The collar is also provided with a few openings 84 as shown in FIGS. 1 and 3 making it possible, when for some reason or other the tab 83 is not accessible, to insert a tool such as a screwdriver into one of these openings in order to remove the collar.

Finally, the collar can be solid or can have recesses 85 making it possible to save material and also increasing the elasticity of the collar.

When high-quality sealing is desired, a seal 10 of the 0-ring type can be housed between the body 4 and the housing 1 and, in this case, the body 4 has a shoulder 43. Such a seal is desirable when the assembly is used for a servocontrolled solenoid valve, as will be seen below.

It should be noted that in the figures, a cylindrical housing of circular cross-section has been shown, but the same means could be used without difficulty if the housing did not have a circular cross-section but another shape, for example an elliptical or even polygonal shape. In such a case, the shape of the body 4 will have to be matched to that of the inside of the housing 1 in order to enable it to move inside the housing and the collar and ring will have a shape corresponding to this cross-section.

As mentioned above, it is possible, for certain applications, to provide for the body 4 to be made of an elastically deformable material and, in this case, the groove 41 is replaced by projections or a continuous projection intended to interact with a groove which may or may not be continuous and which will be provided, in this particular case, on the collar 8 for the snap-fitting of the collar onto the body. In order to ensure that the snap-fitting is of high quality, the collar 8 will preferably be metallic.

The collar 8 may be removed by means of a screwdriver, either by acting under the tab 83, or by inserting the screwdriver into one of the openings 84 in order to take out the collar, and the screwdriver is then inserted through the notch 9 in order to push the ring 6 outward.

Figure 5:
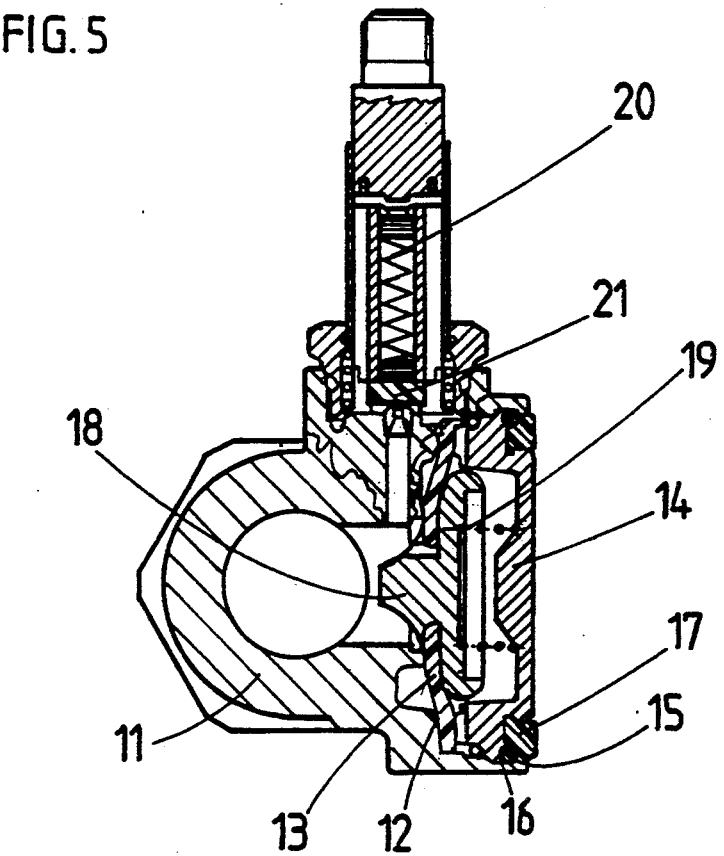
FIG. 5 is a section of a servocontrolled two-way solenoid valve whose elastic membrane is fixed by the device according to the invention.

FIG. 5 shows a servocontrolled two-way solenoid valve provided with a device for fixing the membrane according to the invention. This solenoid valve will be briefly described below.

The solenoid valve comprises a valve body 11 forming, inside, a housing having a shoulder 12 against which is fixed, by clamping, a membrane 13 by means of a cover 14 which is held in position by means of a ring 15 housed in a groove 16 of said housing. The ring 15 is held and locked in position by a collar 17 as described above.

The membrane clamped by the cover 14 is attached to a shutter 18 subjected to the pressure from a spring 19 keeping it in the closed position. In the rest position, a shutter 21, subjected to a spring 20, closes the passage for connecting the two parts of the housing separated by the membrane 13 and the shutter 18. The shutter 21 is actuated by an electromagnet, and the position shown is a rest position. Operation and the remainder of the elements of this solenoid valve which are known per se will not be explained further, since the only subject of the present invention is the device enabling the membrane 13 to be fixed onto the shoulder 12 of the housing of the valve body 11.

We claim:

1. A clamping assembly comprising a cylindrical housing (1) having an opening, an axis and an integral annular shoulder (2) substantially normal to the axis and an elastically compressible member (3; 13), the assembly being so constructed and arranged for the assembly by clamping of the elastically compressible member (3; 13) on the shoulder (2) of the cylindrical housing, said cylindrical housing having a predetermined shape and a cylindrical wall, a body (4; 14) covering the opening and having a shape corresponding to the shape of the housing enabling it to move axially in said housing, wherein said body (4; 14) is immobilized, so as to axially compress the elastically compressible member (3; 13), between the shoulder and the body by a split ring (6; 15) placed in a groove (7; 16) of the cylindrical wall of the housing, the ring having a predetermined shape and dimensions, the shape and dimensions of the ring (6; 15) are selected in such a way that it bears against a peripheral surface of said body in order to prevent it from moving outward, the ring (6; 15) is locked in the groove by an annular safety collar (8; 17) having first zones (82) which, by virtue of their shape, prevent the ring from moving out of said groove (7; 16) and second zones provided with first means (81) for latching engaging corresponding second means (41) for latching on said body for cooperating in the securing by snap-fitting of the collar onto the body.

2. The assembly as claimed in claim 1, wherein the groove (7) of the wall has a notch (9) intended to enable the ring (6) to be removed.

3. The assembly as claimed in claim 2, wherein the collar (8) has a tab (83) covering the notch (9) of the groove which is intended to prevent the ring from being removed before the collar is removed, and to enable the collar to be removed.

4. The device as claimed in claim 1, wherein the collar (8) has means (83) for enabling it to be removed.

5. The assembly as claimed in claim 1, wherein the collar (8) has at least one discontinuity (84) on its visible surface for enabling it to be gripped by a removing member.

6. The assembly as claimed in claim 1, wherein the collar (8) is made of elastically deformable material and the first means are formed by a continuous internal bulge (81) on the ring interacting with a groove (41) of said body (4).

7. The assembly as claimed in claim 1, wherein the body is made of elastically deformable material and is provided with a bulge interacting with a groove of said collar in order to ensure snap-fitting.

8. The assembly as claimed in claim 1, wherein the second zones (82) are formed and sized in order to push the ring (6) into the groove (7) during the mounting of the collar.

9. The assembly as claimed in claim 1, wherein said elastically compressible part is the elastic membrane (13) of a servocontrolled solenoid valve.

10. The assembly as claimed in claim 1, wherein the collar (8) is made of elastically deformable material and the first means are formed by a discontinuous internal bulge (81) on the ring interacting with a groove (41) of said body (4).

* * * * *